(12) United States Patent
Monsere et al.

(10) Patent No.: US 8,180,545 B2
(45) Date of Patent: May 15, 2012

(54) METHODS AND SYSTEMS FOR CALIBRATING BRAKING SYSTEMS AND CONTROLLING BRAKING IN VEHICLES

(75) Inventors: Patrick J. Monsere, Highland, MI (US); Jon K. Logan, Howell, MI (US); Danny Y. Mui, Birmingham, MI (US); Margaret C. Richards, Royal Oak, MI (US); Kevin S. Kidston, New Hudson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 494 days.

(21) Appl. No.: 12/432,462

(22) Filed: Apr. 29, 2009

(65) Prior Publication Data
US 2010/0280724 A1    Nov. 4, 2010

(51) Int. Cl.
*G06F 19/00* (2011.01)
(52) U.S. Cl. ............................................ 701/70; 477/71
(58) Field of Classification Search .................... 701/35, 701/70, 33.3; 303/10, 20, 191; 477/71, 74
See application file for complete search history.

(56) References Cited

U.S. PATENT DOCUMENTS

| | | | | |
|---|---|---|---|---|
| 5,984,435 A | * | 11/1999 | Tsukamoto et al. | 303/191 |
| 6,280,004 B1 | * | 8/2001 | Greaves, Jr. | 303/20 |
| 6,951,525 B2 | * | 10/2005 | Ries-Mueller | 477/74 |

* cited by examiner

*Primary Examiner* — Gertrude Arthur Jeanglaude
(74) *Attorney, Agent, or Firm* — Ingrassia Fisher & Lorenz, P.C.

(57) ABSTRACT

A method for controlling braking in a vehicle having a brake pedal includes the steps of obtaining a first measure of braking intent based on movement of the brake pedal, obtaining a second measure of braking intent based on a force applied to the brake pedal, controlling the braking based on the first measure provided that a transition parameter is less than a first predetermined value, controlling the braking based on the second measure provided that the transition parameter is greater than a second predetermined value, and controlling the braking based on the first measure and the second measure provided that the transition parameter is greater than the first predetermined value and less than the second predetermined value.

20 Claims, 3 Drawing Sheets

METHODS AND SYSTEMS FOR CALIBRATING BRAKING SYSTEMS AND CONTROLLING BRAKING IN VEHICLES

TECHNICAL FIELD

The present invention generally relates to the field of vehicles and, more specifically, to methods and systems for calibrating braking systems and controlling braking in vehicles.

BACKGROUND OF THE INVENTION

To enhance an operator's driving experience and a vehicle's performance and safety, various types of electronic enhancements and systems assist or replicate automotive systems that were previously mechanical in nature. One such automotive system is the brake-by-wire system. In a brake-by-wire system, an operator's activation of the brake pedal is determined by one or more sensors. Data from the sensors is then used by a computer or processor to determine an appropriate braking force to apply to the brakes.

Several different types of brake-by-wire systems exist. For example, in an electro-hydraulic braking system, the computer commands an electro-hydraulic actuator to apply hydraulic pressure to the brake calipers to stop the vehicle. In contrast, in an electromechanical braking system, the braking force is applied instead by an electronic caliper which utilizes a small motor to push the brake pads against the rotor to stop the vehicle. Additionally, vehicles can incorporate combined systems such as electro-mechanical and electro-hydraulic systems. Also, hybrid cars can utilize a combination of friction braking, which can be electromechanical or electro-hydraulic, and regenerative braking, which is also a type of electronic braking in which speed is reduced by converting kinetic energy into electrical energy Regardless of the particular type of braking system, braking systems generally utilize a measure of brake pedal travel or a measure of force applied to the brake pedal in determining driver intent. However, it may be desirable to improve upon the use of brake pedal travel and the force applied to the brake pedal in controlling braking. It may also be desirable to improve calibration of braking system in vehicles, for example to account for any pedal travel loss compared with a prototype vehicle.

Accordingly, it is desirable to provide an improved method for controlling braking for a vehicle and/or calibrating a braking system of a vehicle, for example that improves upon the use of brake pedal travel and the force applied to the brake pedal in controlling braking and/or the calibration of braking system in vehicles, for example to account for any pedal travel loss compared with a prototype vehicle. It is also desirable to provide an improved program product for such controlling of braking for a vehicle and/or calibrating a braking system of a vehicle. It is further desirable to provide an improved system for such controlling of braking for a vehicle and/or calibrating a braking system of a vehicle. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for controlling braking in a vehicle having a brake pedal is provided. The method comprises the steps of obtaining a first measure of braking intent based on movement of the brake pedal, obtaining a second measure of braking intent based on a force applied to the brake pedal, controlling the braking based on the first measure provided that a transition parameter is less than a first predetermined value, controlling the braking based on the second measure provided that the transition parameter is greater than a second predetermined value, and controlling the braking based on the first measure and the second measure provided that the transition parameter is greater than the first predetermined value and less than the second predetermined value.

In accordance with another exemplary embodiment of the present invention, a program product for controlling braking in a vehicle having a brake pedal is provided. The program product comprises a program and a computer-readable signal-bearing media. The program is configured to at least facilitate obtaining a first measure of braking intent based on movement of the brake pedal, obtaining a second measure of braking intent based on a force applied to the brake pedal, controlling the braking based on the first measure provided that a transition parameter is less than a first predetermined value, controlling the braking based on the second measure provided that the transition parameter is greater than a second predetermined value, and controlling the braking based on the first measure and the second measure provided that the transition parameter is greater than the first predetermined value and less than the second predetermined value. The computer-readable signal-bearing media bears the program.

In accordance with a further exemplary embodiment of the present invention, a system for controlling braking in a vehicle is provided. The system comprises a brake pedal, a brake pedal travel sensor, a brake pedal force sensor, and a brake controller. The brake pedal travel sensor is configured to at least facilitate obtaining a first measure of braking intent based on movement of the brake pedal. The brake pedal force sensor is configured to at least facilitate obtaining a second measure of braking intent based on a force applied to the brake pedal. The brake controller is configured to at least facilitate controlling the braking based on the first measure provided that a transition parameter is less than a first predetermined value, controlling the braking based on the second measure provided that the transition parameter is greater than a second predetermined value, and controlling the braking based on the first measure and the second measure provided that the transition parameter is greater than the first predetermined value and less than the second predetermined value.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
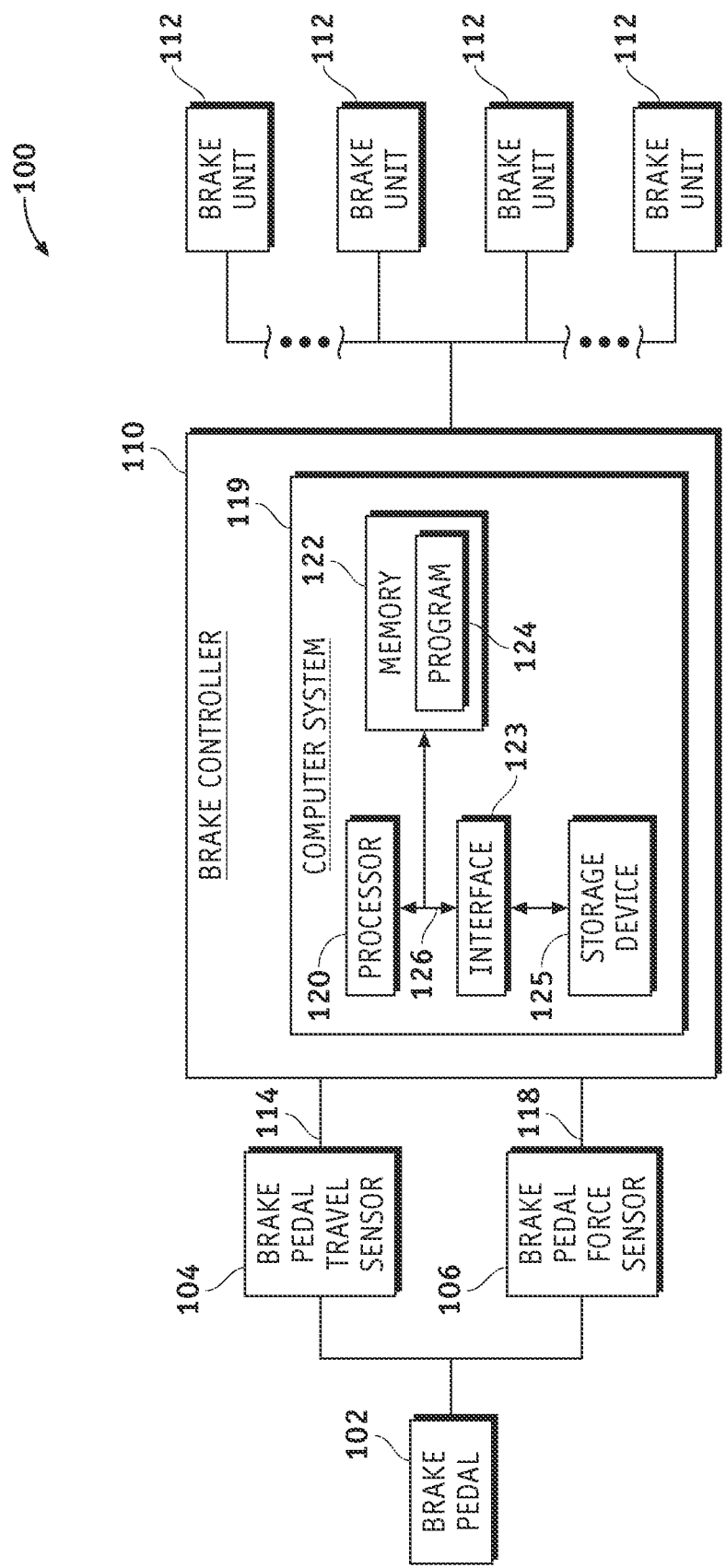
FIG. 1 is a functional block diagram of a control system for use in controlling braking in a vehicle, in accordance with an exemplary embodiment of the present invention.

FIG. 1 is a block diagram of an exemplary braking system 100 for use in a brake-by-wire system. Braking system 100 includes a brake pedal 102, a brake pedal travel sensor 104, a brake pedal force sensor 106, a brake controller 110, and a plurality of brake units 112. The brake pedal 102 provides an interface between an operator of a vehicle and a braking system or a portion thereof, such as the braking system 100, which is used to slow or stop the vehicle. To initiate the braking system 100, an operator would typically use his or her foot to apply a force to the brake pedal 102 to move the brake pedal 102 in a generally downward direction. In one preferred embodiment the braking system 100 is an electro-hydraulic system.

The brake pedal travel sensor 104 and the brake pedal force sensor 106 are coupled to the brake pedal 102. The brake pedal travel sensor 104 provides an indication of how far the brake pedal 102 has traveled, which is also known as brake pedal travel, when the operator applies force to the brake pedal 102. In one exemplary embodiment, brake pedal travel can be determined by how far an input rod in a brake master cylinder has moved. Other methods of measuring brake travel can also be utilized. Regardless of the particular method utilized, the brake pedal travel sensor 104 collects brake pedal travel data for ultimate use by the brake controller 110 in controlling braking for the vehicle and/or calibrating the braking system 100, as described further below.

The brake pedal force sensor 106 determines how much force the operator of braking system 100 is applying to the brake pedal 102. This is also known as brake pedal force. In one exemplary embodiment, the brake pedal force sensor 106 may include a hydraulic pressure emulator and/or a pressure transducer, and the brake pedal force can be determined by measuring hydraulic pressure in a master cylinder of the braking system 100. Other methods of determining the amount of brake pedal force can also be used. Regardless of the particular method utilized, the brake pedal force sensor 106 collects brake pedal force data for ultimate use by the brake controller 110 in controlling braking for the vehicle and/or calibrating the braking system 100, as described further below.

The brake controller 110 is coupled to the brake pedal travel sensor 104 and the brake pedal force sensor 106, as well as to the brake units 112. The brake controller 110 receives a first input 114 from the brake pedal travel sensor 104, namely brake pedal travel data, a second input 116 from the brake pedal force sensor 106, namely brake pedal force data. As described in more detail below, the brake controller 110 uses values from the first and/or second inputs 114, 116 in calibrating the braking system 100 and in controlling braking via the brake units 112, in accordance with the calibration process 200 of FIG. 2 and the control process 300 of FIG. 3 as set forth in greater detail further below.

In the depicted embodiment, the brake controller 110 includes a computer system 119 that includes a processor 120, a memory 122, an interface 123, a storage device 125, and a bus 126. The processor 120 performs the computation and control functions of the brake controller 110, and may comprise any type of processor or multiple processors, single integrated circuits such as a microprocessor, or any suitable number of integrated circuit devices and/or circuit boards working in cooperation to accomplish the functions of a processing unit. During operation, the processor 120 executes one or more programs 124 contained within the memory 122 and, as such, controls the general operation of the computer system 119.

The memory 122 can be any type of suitable memory. This would include the various types of dynamic random access memory (DRAM) such as SDRAM, the various types of static RAM (SRAM), and the various types of non-volatile memory (PROM, EPROM, and flash). The bus 126 serves to transmit programs, data, status and other information or signals between the various components of the computer system 119.

The interface 123 allows communication to the computer system 119, for example from a system driver and/or another computer system, and can be implemented using any suitable method and apparatus. It can include one or more network interfaces to communicate with other systems or components. The interface 123 may also include one or more network interfaces to communicate with technicians, and/or one or more storage interfaces to connect to storage apparatuses, such as the storage device 125.

The storage device 125 can be any suitable type of storage apparatus, including direct access storage devices such as hard disk drives, flash systems, floppy disk drives and optical disk drives. In one exemplary embodiment, the storage device 125 comprises a program product from which memory 122 can receive a program 124 that executes one or more embodiments of one or more processes of the present invention, such as the calibration process 200 of FIG. 2 and/or the control process 300 of FIG. 3 or portions thereof. In another exemplary embodiment, the program product may be directly stored in and/or otherwise accessed by the memory 122 and/or a disk such as that referenced below.

The bus 126 can be any suitable physical or logical means of connecting computer systems and components. This includes, but is not limited to, direct hard-wired connections, fiber optics, infrared and wireless bus technologies. During operation, the program 124 is stored in the memory 122 and executed by the processor 120. It will be appreciated that the brake controller 110 may differ from the embodiment depicted in FIG. 1, for example in that the brake controller 110 may be coupled to or may otherwise utilize one or more remote computer systems and/or other control systems.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 119 may also otherwise differ from the embodiment depicted in FIG. 1, for example in that the computer system 119 may be coupled to or may otherwise utilize one or more remote computer systems and/or other control systems.

The brake units 112 receive the brake commands from the brake controller 110, and are controlled thereby accordingly. The brake units 112 can include any number of different types of devices that, upon receipt of brake commands, can apply the proper braking torque as received from the brake controller 110. For example, in an electro-hydraulic system, the brake units 112 can comprise an actuator that can generate hydraulic pressure that can cause brake calipers to be applied to a brake disk to induce friction to stop a vehicle. Alternatively, in an electromechanical brake-by-wire system, the brake units 112 can comprise a wheel torque-generating device that operates as a vehicle brake. The brake units 112 can also be regenerative braking devices, in which case the brake units 112, when applied, at least facilitate conversion of kinetic energy into electrical energy.

Figure 2:
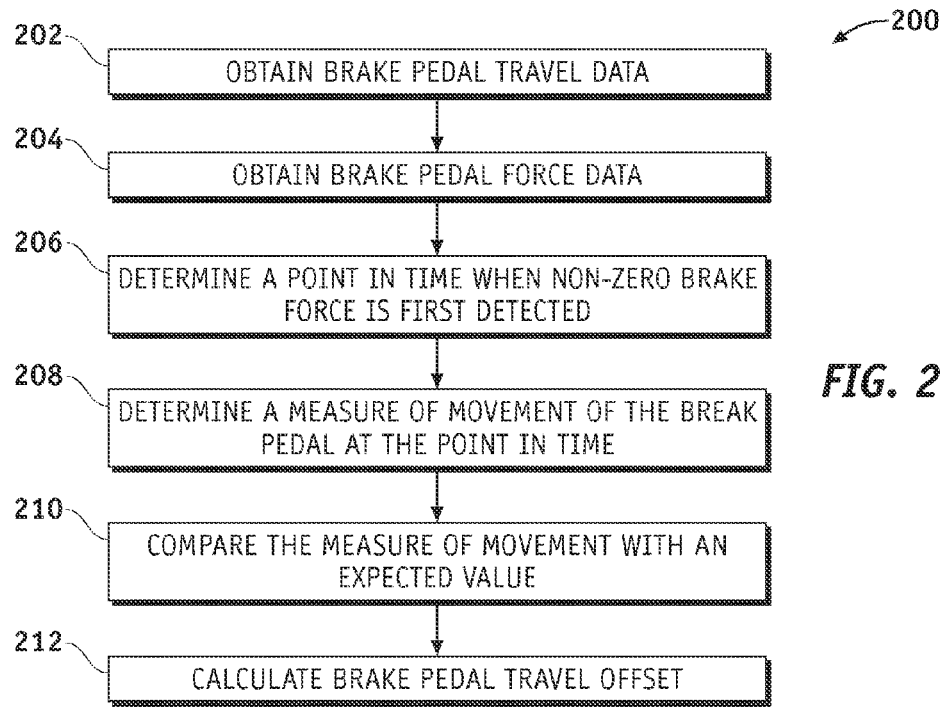
FIG. 2 is a flowchart of a calibration process for calibrating a brake control system of a vehicle, such as the control system of FIG. 1, in accordance with an exemplary embodiment of the present invention.

FIG. 2 is a flowchart of a calibration process 200 for calibrating a braking system of a vehicle, in accordance with an exemplary embodiment of the present invention. The calibration process 200 can be implemented in connection with the braking system 100 of FIG. 1 and/or the computer system 119 of FIG. 1 and/or program products utilized therewith, in accordance with an exemplary embodiment of the present invention. The calibration process 200 will also be described below in connection with FIG. 4, which depicts a graphical representation of certain measures obtained or determined in connection with the calibration process 200 in one exemplary embodiment of the present invention.

Figure 4:
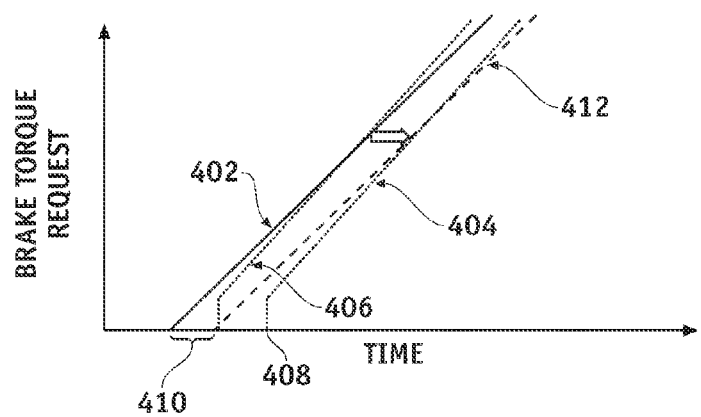
FIG. 4 is a graphical illustration of certain measures, such as a brake pedal travel offset, that are obtained or determined in connection with the control system of FIG. 1 and the calibration process of FIG. 2, in accordance with an exemplary embodiment of the present invention.

As depicted in FIG. 2, the calibration process 200 begins with the step of obtaining brake pedal travel data (step 202). The brake pedal travel data is based on movement of the brake pedal during operation of the vehicle. Also in a preferred embodiment, the brake pedal travel data is obtained by the brake pedal travel sensor 104 of FIG. 1 based on detected movement of the brake pedal 102 of FIG. 1. With reference to FIG. 4, the brake pedal travel data is represented by an exemplary brake pedal travel curve 402.

In addition, brake pedal force data is obtained (step 204). The brake pedal force data is based on a force applied to the brake pedal during operation of the vehicle. In a preferred embodiment, the brake pedal force data is obtained by the brake pedal force sensor 106 of FIG. 1 based on detected force applied to the brake pedal 102 of FIG. 1. With reference to FIG. 4, the brake pedal force data is represented by a measured brake pedal force curve 404 for an exemplary vehicle experiencing pedal travel loss. Also depicted in FIG. 4 is an expected brake pedal force curve 406 for a prototype vehicle that does not experience pedal travel loss.

A point in time is determined when a non-zero brake force is first detected (step 206). This first point in time is preferably determined by the processor 120 of FIG. 1 using the brake pedal force data obtained from the brake pedal force sensor 106 of FIG. in step 204 above. With reference to FIG. 4, this first point in time is represented by point 408.

A measure of movement of the brake pedal is then determined at this first point in time (step 208). This measure of movement of the brake pedal is preferably determined by the processor 120 of FIG. 1 using the brake pedal force data obtained from the brake pedal force sensor 106 of FIG. in step 204 above at the first point in time determined in step 206 above. With reference to FIG. 4, the measure of movement would correspond to the measure of pedal travel at the time corresponding to point 408.

The measure of movement of the brake pedal is then compared with an expected value (step 210). In a preferred embodiment, the expected value corresponds to an expected value of movement of a prototype brake pedal from a prototype vehicle, such as a vehicle corresponding to the expected brake pedal force curve 406 of FIG. 4. In a preferred embodiment, the measure of movement of the brake pedal is compared with the expected value by the processor 120 of FIG. 1.

The pedal travel offset is then calculated (step 212). In a preferred embodiment, the pedal travel offset is calculated by subtracting the expected value from each of a plurality of pedal travel values of the pedal travel data obtained in step 202. The pedal travel offset is preferably calculated by the processor 120 of FIG. 1. With reference to FIG. 4, the pedal travel offset is denoted by offset 410, thereby resulting in an adjusted brake pedal travel curve 412. The brake pedal travel offset is preferably utilized as an offset for brake pedal travel values obtaining in controlling braking, such as in the control process 300 depicted in FIG. 3 and described below.

Figure 3:
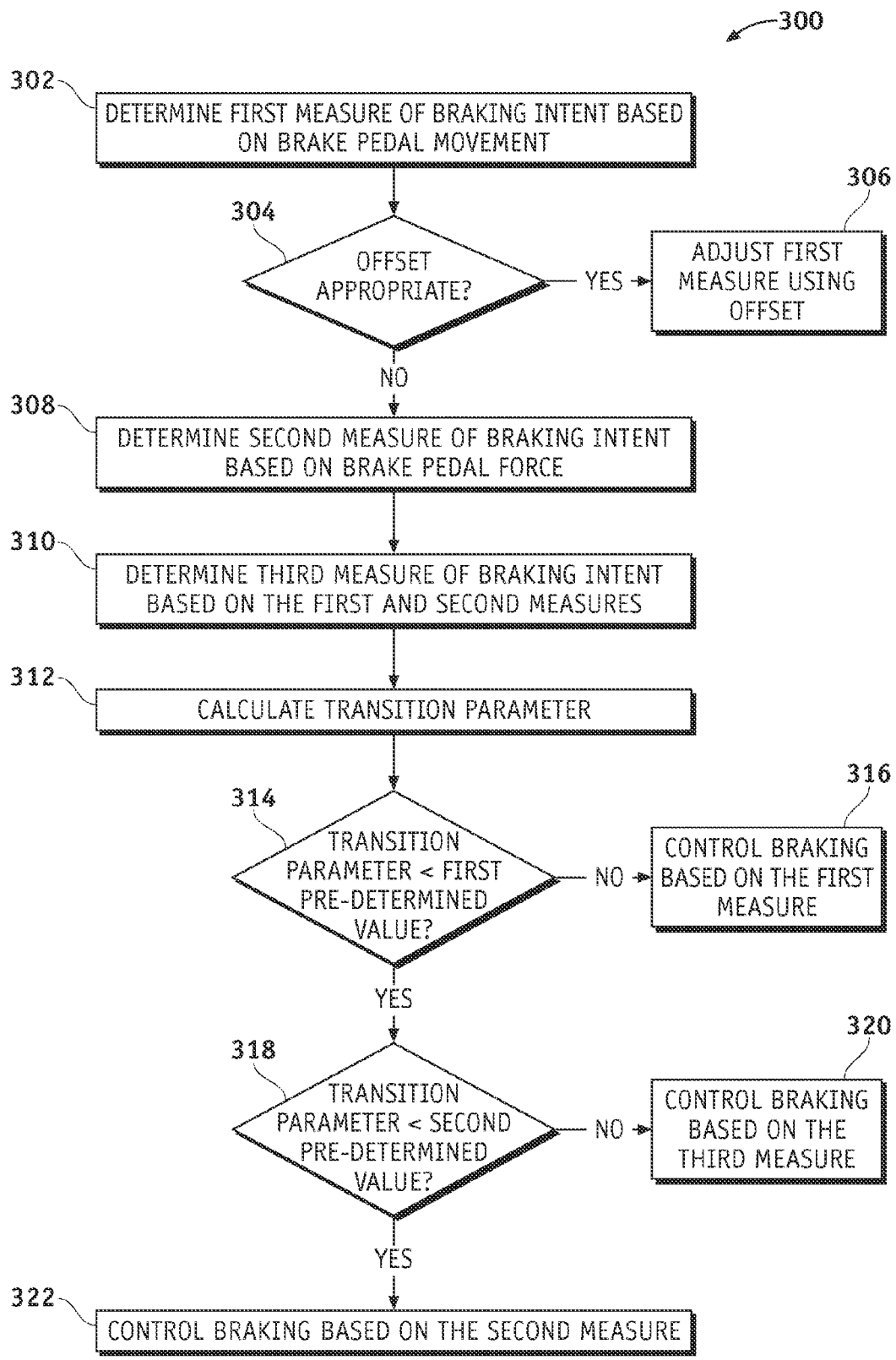
FIG. 3 is a flowchart of a control process for controlling braking in a vehicle, and that can be implemented in connection with the control system of FIG. 1 and the calibration process of FIG. 2, in accordance with an exemplary embodiment of the present invention.

FIG. 3 is a flowchart of a control process 300 for controlling braking of a vehicle, in accordance with an exemplary embodiment of the present invention. The control process 300 can be implemented in connection with the braking system 100 of FIG. 1 and/or the computer system 119 of FIG. 1 and/or program products utilized therewith, in accordance with an exemplary embodiment of the present invention. The control process 300 will also be described below in connection with FIG. 5, which depicts a graphical representation of exemplary brake pedal travel and brake pedal force input measures that can be utilized in connection with the control process 300 in accordance with one exemplary embodiment of the present invention.

Figure 5:
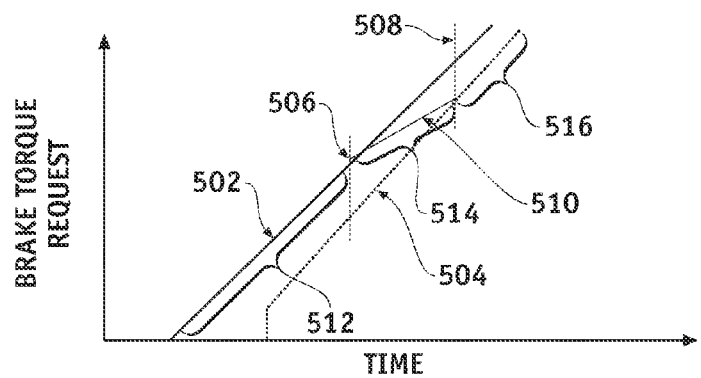
FIG. 5 is a graphical illustration of exemplary brake pedal travel and brake pedal force input measures that can be utilized in connection with the control system of FIG. 1 and the control process of FIG. 3, in accordance with an exemplary embodiment of the present invention.

As depicted in FIG. 3, the control process 300 begins with the step of determining a first measure of braking intent (step 302). The first measure of braking intent is based on movement of the brake pedal during operation of the vehicle. In a preferred embodiment, the first measure of braking intent is determined by the processor 120 of FIG. 1 based on movement of the brake pedal 102 of FIG. 1 as detected by the brake pedal travel sensor 104 of FIG. 1. With reference to FIG. 5, the first measure of braking intent is represented by an exemplary brake pedal travel curve 502.

A determination is made as to whether a brake pedal travel offset is appropriate for the first measure of braking intent (step 304). The brake pedal travel offset preferably corresponds to the brake pedal travel offset calculated in step 212 of the calibration process 200 of FIG. 2. However, this may vary in other embodiments. Also in a preferred embodiment, this determination is made by the processor 120 of FIG. 1. In one preferred embodiment, the brake pedal travel offset is appropriate if a brake pedal travel speed is within a predetermined range. In another preferred embodiment, the brake pedal travel offset is appropriate if the brake pedal travel offset is less than a predetermined value.

If it is determined that the brake pedal travel offset is appropriate, then the first measure of braking intent is adjusted by the brake pedal travel offset (step 306). In a preferred embodiment, the brake pedal travel offset is subtracted from each of the brake pedal travel values used to calculate the first measure of braking intent, and the first measure of braking intent is then recalculated using these adjusted brake pedal travel values to thereby adjust the first measure of braking intent. If it is determined that the brake pedal travel offset is not appropriate, then the first measure of braking intent is not adjusted in this manner.

A second measure of braking intent is also determined (step 308). The second measure of braking intent is based on a force applied to the brake pedal during operation of the vehicle. In a preferred embodiment, the second measure of braking intent is determined by the processor 120 of FIG. 1 based on force applied to the brake pedal 102 of FIG. 1 as detected by the brake pedal force sensor 106 of FIG. 1. With reference to FIG. 5, the second measure of braking intent is represented by an exemplary brake pedal force curve 504.

A third measure of braking intent is then determined (step 310). The third measure of braking intent is determined using the first measure of braking intent from step 302 and the second measure of braking intent from step 308. The third measure of braking intent is greater than one of the first and second measures of braking intent and is less than the other of the first and second measures of braking intent. In a preferred embodiment, the third measure of braking intent is determined using a linear interpolation between values of the first measure of braking intent and values of the second measure of braking intent. Also in a preferred embodiment, the third measure of braking intent is determined by the processor 120 of FIG. 1. With reference to FIG. 5, the third measure of braking intent is represented by an exemplary transition curve 510.

A transition parameter is also calculated (step 312). The transition parameter is used in determining which of the first, second, or third measures of braking intent will be used in controlling braking for the vehicle. In one preferred embodiment, the transition parameter is equal to or a function of brake pedal travel. In another preferred embodiment, the transition parameter is equal to or a function of brake pedal force. In various other preferred embodiments, the transition parameter may be a function of both brake pedal force and brake pedal travel, and/or of one or more other variables. Also in a preferred embodiment, the transition parameter is calculated by the processor 120 of FIG. 1.

A determination is then made as to whether the transition parameter is less than a first predetermined threshold value (step 314). In one exemplary embodiment, the first predetermined threshold value is equal to twenty-five percent of a maximum brake pedal travel for the brake pedal. In another exemplary embodiment, the first predetermined threshold value is equal to twenty-five percent of a maximum brake pedal force for the brake pedal. Various other values may also be used for the first predetermined threshold value. In a preferred embodiment, this determination is made by the processor 120 of FIG. 1.

If it is determined in step 314 that the transition parameter is less than the first predetermined threshold value, braking is controlled based on the first measure of braking intent (step 316). In a preferred embodiment, the brake units 112 of FIG. 1 are controlled in accordance with instructions provided by the processor 120 of FIG. 1 that are based on the first measure of braking intent of step 302 when the transition parameter is less than the first predetermined threshold value. With reference to FIG. 5, braking is preferably controlled based on the first measure of braking intent within region 512 of FIG. 5.

Conversely, if a determination is made in step 314 that the transition parameter is greater than or equal to the first predetermined threshold value, a further determination is made as to whether the transition parameter is less than a second predetermined threshold value (step 318). In one exemplary embodiment, the second predetermined threshold value is equal to seventy-five percent of a maximum brake pedal travel for the brake pedal. In another exemplary embodiment, the second predetermined threshold value is equal to seventy-five percent of a maximum brake pedal force for the brake pedal. Various other values may also be used for the second predetermined threshold value. In a preferred embodiment, this determination is made by the processor 120 of FIG. 1.

If it is determined in step 318 that the transition parameter is greater than or equal to the second predetermined threshold value (that is, if the transition parameter is greater than or equal to the second predetermined threshold value and greater than or equal to the first predetermined threshold value), braking is controlled based on the third measure of braking intent (step 320). In a preferred embodiment, the brake units 112 of FIG. 1 are controlled in accordance with instructions provided by the processor 120 of FIG. 1 that are based on the third measure of braking intent of step 310 when the transition parameter is greater than or equal to the second predetermined threshold value and less than the first predetermined threshold value. With reference to FIG. 5, braking is preferably controlled based on the third measure of braking intent within region 516 of FIG. 5.

Conversely, if a determination is made in step 318 that the transition parameter is less than the second predetermined threshold value, (that is, if the transition parameter is less than the second predetermined threshold value and greater than or equal to the first predetermined threshold value), braking is controlled based on the second measure of braking intent (step 322). In a preferred embodiment, the brake units 112 of FIG. 1 are controlled in accordance with instructions provided by the processor 120 of FIG. 1 that are based on the second measure of braking intent of step 308 when the transition parameter is less than both of the first and second predetermined threshold values. With reference to FIG. 5, braking is preferably controlled based on the second measure of braking intent within region 514 of FIG. 5.

Thus, the control process 300 of FIG. 3 provides braking control based on the first measure of braking intent alone, the second measure of braking intent alone, or a combination of the first and second measures of braking intent, depending on the transition parameter. For example, in a typical braking event in which the transition parameter value (for example, brake pedal travel or brake pedal force) would be relatively low, braking is controlled based upon brake pedal travel as represented in the first measure of braking intent. In a panic braking situation in which the transition parameter value (for example, brake pedal travel or brake pedal force) would be relatively high, braking is controlled based upon brake pedal force as represented in the second measure of braking intent. In intermediate situations such as the beginning of a panic braking event in which the transition parameter (for example, brake pedal travel or brake pedal force) may be heading toward a relatively high value, the braking is controlled based upon both the brake pedal force as represented in the first measure of braking intent and also upon the second measure of braking intent represented in the second measure of braking intent. Specifically, in such intermediate situations, braking is controlled preferably based upon a linear interpolation between the first and second measures of braking intent. This allows for smooth transitions between use of brake pedal travel and brake pedal force values in controlling braking, and also helps to ensure that a proper transition is made to brake pedal force-based braking control in panic braking situations in which the brake pedal travel-based braking intent and brake pedal force-based braking intent may never intersect, for example due to brake pedal travel loss in the braking system.

Accordingly, improved methods, program products, and systems are provided. The improved methods, program products, and systems provide for improved controlling of braking in vehicles, for example through use of a linear transition between brake pedal travel-based braking intent and brake pedal force-based braking intent as appropriate. The improved methods, program products, and systems also provide for improved calibration of braking systems of vehicles, for example to account for any pedal travel loss compared with a prototype vehicle.

It will be appreciated that the disclosed methods, program products, and systems may vary from those depicted in the Figures and described herein. It will similarly be appreciated that the disclosed methods, program products, and systems may be implemented and/or utilized in connection with any number of different types of automobiles, sedans, sport utility vehicles, trucks, and/or any of a number of other different types of vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for controlling braking in a vehicle having a brake pedal, the method comprising the steps of:
   determining a first measure of braking intent based on movement of the brake pedal;
   determining a second measure of braking intent based on a force applied to the brake pedal;
   controlling the braking based on the first measure provided that a transition parameter is less than a first predetermined value;
   controlling the braking based on the second measure provided that the transition parameter is greater than a second predetermined value; and
   controlling the braking based on the first measure and the second measure provided that the transition parameter is greater than the first predetermined value and less than the second predetermined value.

2. The method of claim 1, wherein the step of controlling the braking based on the first measure and the second measure comprises the steps of:
   determining a third measure of braking intent using the first measure and the second measure, the third measure being greater than one of the first and second measures and less the other of the first and second measures; and
   controlling the braking based on the third measure provided that the transition parameter is greater than the first predetermined value and less than the second predetermined value.

3. The method of claim 2, wherein the step of determining the third measure comprises the step of:
   determining the third measure using a linear interpolation between values of the first measure and values of the second measure.

4. The method of claim 1, wherein the transition parameter is a function of the movement of the brake pedal.

5. The method of claim 1, wherein the transition parameter is a function of the force applied to the brake pedal.

6. The method of claim 1, further comprising the steps of:
   obtaining brake pedal travel data based on movement of the brake pedal;
   obtaining brake pedal force data based on a force applied to the brake pedal;
   determining a point in time in which a non-zero brake pedal force is first detected from the brake pedal force data;
   determining a measure of movement of the brake pedal at the point in time;
   comparing the measure of movement with a predetermined value to determine a brake pedal travel offset; and
   adjusting the measure of braking intent using the brake pedal travel offset.

7. The method of claim 6, wherein the step of comparing the measure of movement with the predetermined value comprises the step of:
   comparing the measure of movement with an expected value of movement of a prototype brake pedal from a prototype vehicle; and
   subtracting the expected value of movement from the measure of movement, to calculate the brake pedal travel offset.

8. The method of claim 6, wherein the step of adjusting the first measure of braking intent comprises the step of:
   subtracting the brake pedal travel offset from each of a plurality of values of the first measure of braking intent.

9. The method of claim 6, wherein the step of adjusting the first measure of braking intent comprises the step of:
   adjusting the first measure of braking intent using the brake pedal travel offset on the further condition that a brake pedal travel speed is within a predetermined range.

10. The method of claim 6, wherein the step of adjusting the first measure of braking intent comprises the step of:
    adjusting the first measure of braking intent using the brake pedal travel offset on the further condition that the brake pedal travel offset is less than the predetermined value.

11. A program product for controlling braking in a vehicle having a brake pedal, the program product comprising:
    a program configured to at least facilitate:
       determining a first measure of braking intent based on movement of the brake pedal;
       determining a second measure of braking intent based on a force applied to the brake pedal;
       controlling the braking based on the first measure provided that a transition parameter is less than a first predetermined value;
       controlling the braking based on the second measure provided that the transition parameter is greater than a second predetermined value; and
       controlling the braking based on the first measure and the second measure provided that the transition parameter is greater than the first predetermined value and less than the second predetermined value; and
    a computer-readable signal-bearing media bearing the program.

12. The program product of claim 11, wherein the program is further configured to at least facilitate:
    determining a third measure of braking intent using the first measure and the second measure, the third measure being greater than one of the first and second measures and less the other of the first and second measures; and
    controlling the braking based on the third measure provided that the transition parameter is greater than the first predetermined value and less than the second predetermined value.

13. The program product of claim 12, wherein the program is further configured to at least facilitate determining the third measure using a linear interpolation between values of the first measure and values of the second measure.

14. The program product of claim 11, wherein the transition parameter is a function of the movement of the brake pedal, the force applied to the brake pedal, or both.

15. The program product of claim 11, wherein the program is further configured to at least facilitate:
- obtaining brake pedal travel data based on movement of the brake pedal;
- obtaining brake pedal force data based on a force applied to the brake pedal;
- determining a point in time in which a non-zero brake pedal force is first detected from the brake pedal force data;
- determining a measure of movement of the brake pedal at the point in time;
- comparing the measure of movement with a predetermined value to determine a brake pedal travel offset; and
- adjusting the measure of braking intent using the brake pedal travel offset.

16. A system for controlling braking in a vehicle, the system comprising:
- a brake pedal;
- a brake pedal travel sensor configured to at least facilitate detecting movement of the brake pedal;
- a brake pedal force sensor configured to at least facilitate detecting a force applied to the brake pedal; and
- a brake controller configured to at least facilitate:
  - determining a first measure of braking intent based on the movement of the brake pedal;
  - determining a second measure of braking intent based on the force applied to the brake pedal
  - controlling the braking based on the first measure provided that a transition parameter is less than a first predetermined value;
  - controlling the braking based on the second measure provided that the transition parameter is greater than a second predetermined value; and
  - controlling the braking based on the first measure and the second measure provided that the transition parameter is greater than the first predetermined value and less than the second predetermined value.

17. The system of claim 16, wherein the controller is further configured to at least facilitate:
- determining a third measure of braking intent using the first measure and the second measure, the third measure being greater than one of the first and second measures and less the other of the first and second measures; and
- controlling the braking based on the third measure provided that the transition parameter is greater than the first predetermined value and less than the second predetermined value.

18. The system of claim 17, wherein the controller is further configured to at least facilitate determining the third measure using a linear interpolation between values of the first measure and values of the second measure.

19. The system of claim 16, wherein the transition parameter is a function of the movement of the brake pedal, the force applied to the brake pedal, or both.

20. The system of claim 16, wherein the controller is further configured to at least facilitate:
- obtaining brake pedal travel data based on movement of the brake pedal;
- obtaining brake pedal force data based on a force applied to the brake pedal;
- determining a point in time in which a non-zero brake pedal force is first detected from the brake pedal force data;
- determining a measure of movement of the brake pedal at the point in time;
- comparing the measure of movement with a predetermined value to determine a brake pedal travel offset; and
- adjusting the measure of braking intent using the brake pedal travel offset.

* * * * *